US00RE35086E

United States Patent [19]

Paulson et al.

[11] E Patent Number: Re. 35,086

[45] Reissued Date of Patent: Nov. 14, 1995

[54] SLITTING APPARATUS FOR CORRUGATED PAPERBOARD AND THE LIKE

[75] Inventors: Richard F. Paulson, Phillips, Wis.; Kent L. Ross, Owatonna, Minn.; Timothy C. Prochnow, Phillips, Wis.; David W. Dix, L'Anse, Mich.; Luke A. Stout, Phillips, Wis.

[73] Assignee: Marquip, Inc., Phillips, Wis.

[21] Appl. No.: 200,225

[22] Filed: Feb. 23, 1994

Related U.S. Patent Documents

Reissue of:

[64] Patent No.: 5,090,281
Issued: Feb. 25, 1992
Appl. No.: 739,795
Filed: Aug. 1, 1991

U.S. Applications:

[63] Continuation of Ser. No. 490,793, Mar. 8, 1990, abandoned.

[51] Int. Cl.[6] ..... B26D 1/22

[52] U.S. Cl. ..... 83/13; 83/169; 83/174; 83/498; 83/508.3

[58] Field of Search ..... 83/13, 169, 174, 83/495, 498, 499, 500, 501, 504, 505, 508.2, 508.3, 676, 425.4

[56] References Cited

U.S. PATENT DOCUMENTS

| | | |
|---|---|---|
| 279,083 | 6/1883 | Dexter . |
| 1,406,947 | 2/1922 | Evans . |
| 2,895,553 | 7/1959 | DeGelleke . |
| 2,996,982 | 8/1961 | Alm . |
| 3,003,403 | 10/1961 | Goettsch . |
| 3,167,983 | 2/1965 | Braun . |
| 3,272,042 | 9/1966 | Haas . |
| 3,302,506 | 2/1967 | Turner et al. . |
| 3,585,888 | 6/1971 | Wiatt . |
| 3,599,518 | 8/1971 | Goettsch . |
| 3,623,520 | 11/1971 | Neild . |
| 3,791,246 | 2/1974 | Lazickas . |
| 3,927,706 | 12/1975 | Davey . |
| 3,949,654 | 4/1976 | Stehlin . |
| 3,974,727 | 8/1976 | Stehlin . |
| 4,420,996 | 12/1983 | Greding et al. . |
| 4,649,782 | 3/1987 | Cavagna . |
| 4,658,685 | 4/1987 | Bodewein . |
| 4,669,347 | 6/1987 | Worner . |
| 4,684,360 | 8/1987 | Tokuno et al. . |
| 4,725,261 | 2/1988 | Millard et al. . |
| 4,781,668 | 11/1988 | Mowry . |
| 4,848,200 | 7/1989 | McGehee . |
| 4,854,204 | 8/1989 | Faltin . |

FOREIGN PATENT DOCUMENTS

| | | |
|---|---|---|
| 2225152 | 5/1972 | Germany . |
| 3229368 | 8/1982 | Germany . |
| 2098108 | 5/1981 | United Kingdom . |

*Primary Examiner*—Scott A. Smith
*Attorney, Agent, or Firm*—Andrus, Sceales, Starke & Swall

[57] ABSTRACT

An apparatus for providing longitudinal, laterally spaced slits in a continuously moving sheet or web of corrugated paperboard or the like includes a plurality of upper tool heads each supporting a thin, circular rotary slitting blade. The blades are coaxially mounted and driven by a common drive shaft and each blade-carrying tool head is independently positionable across the width of the paperboard sheet. Each slitting assembly includes a lower tool head or counterhead carrying a roller assembly which supports the underside of the moving board and provides a firm surface to support the board against the upper rotary slitting blade. The roller assembly includes a circumferential radially extending slot in its outer surface through which an edge portion of the upper cutting blade travels with the sheet firmly supported by the roller surfaces on each side of the slot. A blade lubricator is attached to the upper head and applies a thin film of lubricant to the blade edge by direct engagement by a lubricating wick while the blade is rotating. The thin blade is maintained in a sharpened condition by periodic engagement with a rotary sharpening tool pivotally attached to the upper tool head for periodic light sharpening contact with one face of the beveled blade cutting edge.

23 Claims, 3 Drawing Sheets

SLITTING APPARATUS FOR CORRUGATED PAPERBOARD AND THE LIKE

Matter enclosed in heavy brackets [ ] appears in the original patent but forms no part of this reissue specification; matter printed in italics indicates the additions made by reissue.

This is a *reissue of application Ser. No. 07/739,735, filed Aug. 1, 1991, now U.S. Pat. No. 5,090,281, which is a* continuation of application Ser. No. 07/490,793, flied Mar. 8, 1990, now abandoned.

BACKGROUND OF THE INVENTION

The present invention relates to an apparatus for slitting a traveling corrugated paperboard sheet and, in particular, to a thin rotary blade slitting apparatus for substantially improving the quality of the slit.

Apparatus for longitudinally slitting a continuous traveling sheet or web of corrugated paperboard is well known in the art. Such apparatus is often combined with a mechanism for simultaneously providing longitudinal score lines to the advancing sheet, which score lines facilitate subsequent folding in the construction of boxes or the like. Thus, a combined "slitter-scorer" utilizes pairs of rotatable cutting tools and scoring tools disposed in the path of the advancing sheet, with one tool of each pair disposed on an opposite side of the sheet. Typically, multiple slitting tools are mounted coaxially and laterally spaced across the width of the sheet and, likewise, multiple scoring tools are also coaxially mounted and spaced across the sheet width.

In the prior art, each pair of upper and lower slitting tools is disposed with overlapping radial cutting edges between which the advancing paperboard sheet is moved to provide a continuous cut. Although the operation is commonly referred to as "slitting", the cutting tools in fact shear the moving sheet causing a relative vertical displacement of the cut edges from one another. As the thickness of the corrugated board being processed increases, the cuts tend to become more ragged, the edges tend to be crushed, and the cut quality tends to degrade significantly. Another problem commonly associated with rotary shear cutting of corrugated board is the generation of dust. Fine paper dust is a very serious problem which may result in clogged filters on air handling systems, hazardous air quality for workers, contamination of electronic and other equipment, and even explosion or fire hazards.

Other methods and apparatus for cutting corrugated paperboard have been developed to eliminate or alleviate some of the problems associated with rotary shear cutting. Thus, it is known to utilize high pressure water jets to cut paperboard. Water jets provide high quality cuts, but the equipment has an extremely high initial cost and requires costly maintenance.

U.S. Pat. No. 4,627,214 shows a slitter-scorer apparatus of one prior art construction in which the board is sheared by passage between the overlapping edges of a pair of rotary cutting knives. Even when such cutting knives are properly adjusted and maintained in a sharpened condition, their use to slit heavier double and triple wall board has been less than satisfactory.

There is a need, therefore, for an apparatus which will provide a clean, dust-free cut in an efficient and economical manner.

SUMMARY OF THE INVENTION

In accordance with the present invention, corrugated paperboard is cut with a true slitting technique in an apparatus in which the advancing sheet or web of paperboard is advanced through a sharp, thin circular blade running in the same direction as the paperboard sheet but at a much higher speed, with the board supported below the blade by rollers on the underside.

In its basic embodiment, an upper tool head is mounted over the sheet and is laterally translatable across the width of the sheet to position the tool head on the desired cut line. An annular cutting blade is rotatably attached to the tool head such that the peripheral cutting edge of the blade extends downwardly beyond the opposite side of the board sheet. A lower tool head or counterhead is mounted on the underside of the sheet and is also laterally translatable across the width of the sheet on a line parallel to the line of lateral translation of the upper tool head. Roller means are rotatably attached to the counterhead and present a cylindrical outer surface which is positioned to make tangent contact with and support the underside of the sheet. The roller means are provided with an annular circumferential slot in the outer surface, which slot has a width slightly greater than the width of the blade and is positioned to receive the rotating blade edge therein. Thus, the overlapping blade and roller means form a nip into which the moving sheet is fed for slitting. Drive means are provided to rotate the slitting blade edge in the direction of movement of the sheet and at a speed greater than the speed of the moving sheet. Means are also provided for applying a lubricant to the cutting edge of the blade which prevents a build-up on the blade of starch from the glue used to hold the components of the corrugated board together.

Preferably, the supporting roller means is formed from a pair of coaxially mounted rollers which are axially spaced such that their adjacent interior faces define the annular circumferential slot for receipt of the slitting blade. The rotational axis of the rollers is preferably offset in the upstream direction, with respect to movement of the sheet, from the rotational axis of the blade. Also, the diameter of the rollers is less than the diameter of the slitting blade and the offset position of the rollers is established such that the line of tangent contact of the rollers with the underside of the sheet defines a line which is normal and tangent to the blade edge where it exits the lower surface of the sheet.

The adjacent interior faces of the supporting rollers determining the circumferential slot preferably diverge in a radially inward direction. Alternately, the adjacent interior faces of the rollers may be recessed to define open interior portions. In either embodiment, the rollers are relatively more open in a radially inward direction to provide space for the accumulation of paper scraps, dust and the like. Preferably, a stripper bar is attached to the roller-supporting counterhead and extends through the circumferential slot to present an edge defining an acute angle with respect to the plane of the sheet and to diverge therefrom in the downstream direction of sheet movement. The combined rotary movement of the blade and rollers tends to cause accumulating paper scrap and the like to move along the stripper bar and out of the slot between the rollers.

In the preferred embodiment, the lubricant applying means comprises a wick holder which is attached to the upper tool head and presents a pair of spaced generally parallel legs positioned to straddle the cutting edge of the blade. A wick is mounted on the inside of the legs of the wick holder to maintain contact with the blade edge while the blade is rotating and metered amounts of a lubricant are supplied to the wick. The wick holder is pivotally attached to the tool head for movement between the operative lubricating position and an inoperative position spaced radially beyond the blade edge to facilitate blade changing.

The slitting apparatus of the preferred embodiment also includes means for sharpening the blade edge on the fly or while the blade is rotating. The sharpening means includes a bracket attached to the upper tool head, a rotary sharpening tool pivotally attached to the bracket for movement between an operative position in contact with the cutting edge of the blade and an inoperative position out of contact therewith, means for moving the tool between its operative and inoperative positions, and means for rotating the tool when it is in its operative position in contact with the blade.

The longitudinal slitting apparatus of the preferred embodiment is utilized on a slitting apparatus of the prior art type in which a plurality of slits are provided spaced across the width of a traveling sheet or web. Thus, an upper support structure is positioned to overlie the advancing sheet and has an upper guide means defining a linear path across the width of the sheet. A plurality of upper tool heads are mounted on the upper guide means such that each of the upper tool heads may be individually moved along the linear path across the sheet. A blade holder is rotatably attached to each upper tool head and positioned for rotation on a common axis. A drive shaft is positioned on the common axis of the blade holders to simultaneously drive the same and to support the tool holders and upper tool heads for movement along the upper guide means. A thin annular slitting blade is carried on each of the blade holders, each blade presenting a downwardly depending circular cutting edge which extends below the bottom face of the sheet, as previously described. A lower support structure is disposed under the sheet and includes lower guide means defining a lower linear path across the width of the sheet and parallel to the upper linear path. A plurality of lower tool heads are mounted on the lower guide means with each-of said lower tool heads individually movable on the guide means along the lower linear path. Roller means are rotatably attached to each of the lower tool heads, in a manner previously described, with the outer surface of the roller positioned to make tangent contact with the underside of the sheet. An annular circumferential slot is provided in the outer surface of the roller means, the slot having a width sufficient to receive therein the portion of the blade edge extending below the sheet. Means are providing for advancing the sheet over the roller means and into the blade cutting edges, for rotating the drive shaft to move the blade cutting edges at a speed greater than the speed of the moving sheet, and for applying a lubricant to the blade cutting edges.

Preferably, each upper tool head includes separate positioning means for moving the tool head along the upper guide means and for carrying therewith its corresponding lower tool head along the lower guide means. In its most simple embodiment, the lower tool head is carried by virtue of contact between the slitting blade and the roller means. To provide a greater bearing surface for carrying contact between the blade and the roller means, each of the roller means may be pivotally attached to a lower tool head on a pivot axis parallel to the axis of rotation of the roller means to increase the amount of the blade edge which is received in the circumferential slot in-the roller means.

Rotation of the slitting blades at a speed substantially in excess of the speed of the moving paperboard sheet, e.g. two or more times faster, provides a clean razor slit which is virtually dust free, thereby substantially eliminating all of the dust-related problems of prior art rotary shear cutting apparatus. On the fly blade lubrication and sharpening provide, respectively, elimination of starch build-up on the blades and the ability to maintain sharp cutting edges for extended periods of operation without shutdown.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENTS

Figure 1:
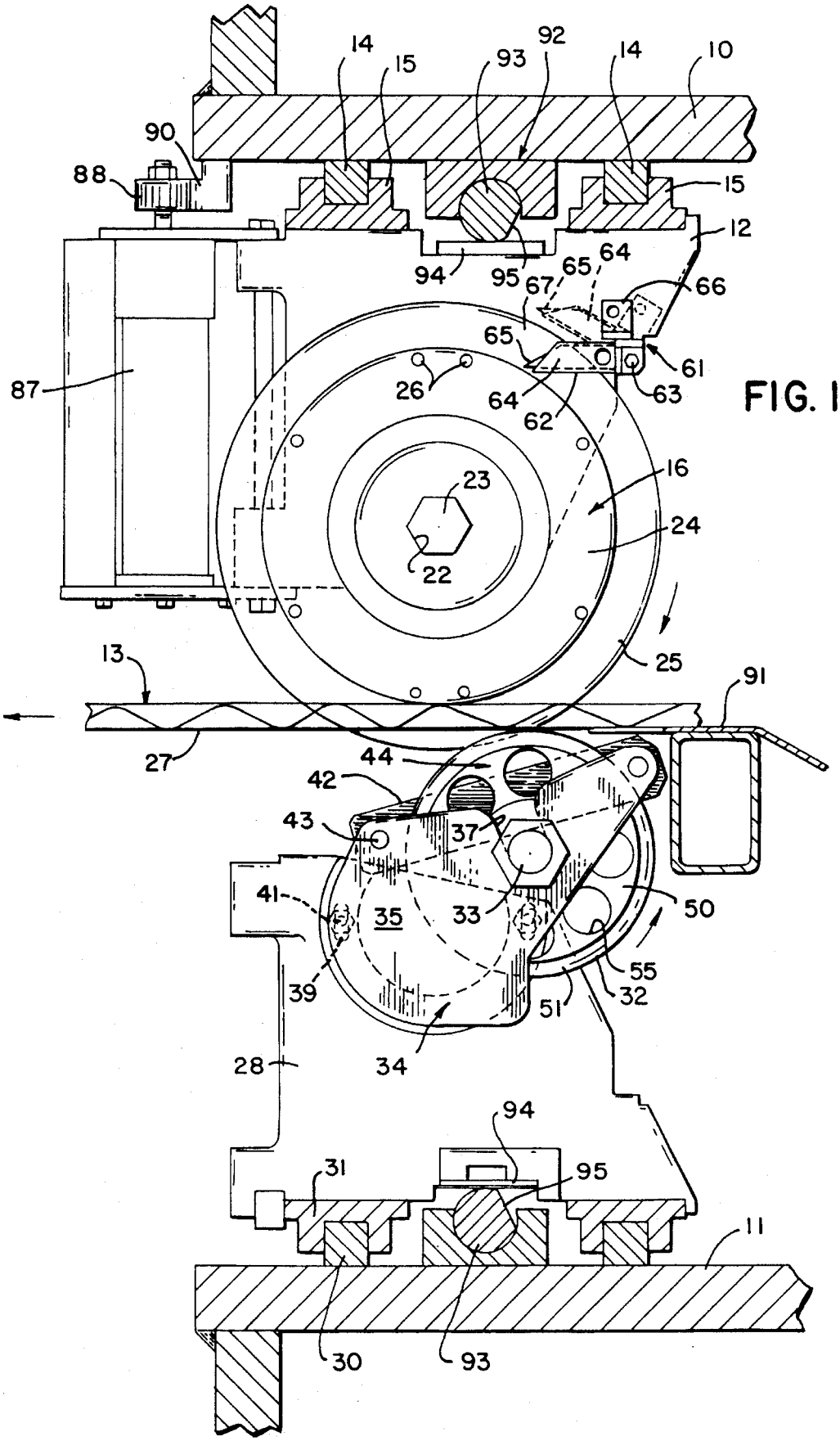
FIG. 1 is a side elevation, partly in section of the rotary slitting apparatus of the present invention.

The main supporting framework for the slitting apparatus of the present invention includes a horizontal upper beam 10 and a parallel lower beam 11. The beams 10 and 11 extend across the width of the slitting apparatus and are somewhat longer than the maximum width of a continuous moving web or sheet 13 of corrugated paperboard or the like which moves between the beams and the attached components of the slitting apparatus to be hereinafter described. A plurality of upper tool heads 12 are attached to the underside of the upper beam 10 for individual movement across the width of the sheet 13 on a pair of linear ways 14 attached to the beam 10. Each upper tool head 12 has a pair of linear bearing pads 15 attached to its upper edge, which bearing pads connect the tool head to the linear ways 14 for positioning movement to set the tool head in the position where a longitudinal slit in the sheet 13 is desired.

A rotary tool holder 16 is attached to each upper tool head 12. The tool holder 16 includes an inner hub 17 which forms the inner race of a rotary bearing 18. The outer race 20 of the rotary bearing 18 is secured in an annular boss 21 in the tool head 12. The inner hub 17 of the tool holder 16 has an axial through bore 22 having a non-circular cross section, such as the hexagonal shape shown. The through bores 22 of the tool holders 16 mounted on the plurality of tool heads 12 lie on a common axis. A drive shaft 23 having a hexagonal cross section is mounted to extend through the bores 22 in each plurality of coaxially mounted tool holders 16. The drive shaft 23 extends across the full width of the apparatus and is connected at one end to suitable drive means, whereby its driving rotation causes tool holders 16 to rotate in bearings 18 with respect to the tool heads 12. Also, the drive shaft 23 provides support for the commonly mounted tool holders 16 and tool heads 12 for movement along the linear ways 14. Each tool holder 16 includes an outer hub 24 to which a thin annular slitting blade 25 is demountably attached, as with a series of machine screws 26 disposed in a circular pattern. The blades 25 depend downwardly from their respective tool heads such that the circular cutting edge extends below the underside 27 of the corrugated paperboard sheet 13.

A plurality of lower tool heads 28 are supported for. individual sliding movement along a pair of lower linear ways 30 which are, in turn, attached to the upper surface of the lower beam 11. Each lower tool head 28 is supported for movement along the linear ways 30 by a pair of bearing pads 31 similar to the pads 15 on the upper tool heads 12. A pair of identical rollers 32 are coaxially mounted on each lower tool head 28 for rotation on an axis parallel to the axis of the upper drive shaft 23. The rollers 32 are mounted with suitable bearings on a roller shaft 33 which is, in turn, supported in a roller mounting bracket 34. The roller mounting bracket comprises a pair of vertical side plates 35 interconnected at their lower edges by a cross piece 36. Each of the side plates includes an upwardly opening mounting slot 37 in its upper edge for receipt of the roller shaft 33. The roller mounting bracket 34 is adjustably attached to one face of the lower tool head 28 by a pair of locking screws 41. Vertical adjustment of the rollers 32 is provided with a pair of diametrically opposite adjustment slots 39 in the side plate 35 adjacent the roller mounting bracket 34. In this manner, the vertical position of the rollers 32 may be varied at the time of machine set-up to obtain accurate vertical positioning. The roller mounting bracket is locked in position with the locking screws 41 extending through the slots 39 and into suitably tapped holes in the lower tool head 28.

The rollers 32 are maintained axially spaced on the roller shaft 33, as by the use of suitable shims, to define therebetween an annular circumferential slot 44 having a width slightly greater than the width of the blade 25. The roller mounting bracket 34 and attached rollers 32 are positioned to make tangent contact with the lower surface of the moving sheet 13 and to allow a portion of the downwardly depending edge of the blade 25 to be received in the circumferential slot 44 between the rollers. The blade 25 is rotated in a clockwise direction as viewed in FIG. 1 and the moving sheet 13 is directed over the rollers 32 and into the nip formed by the rollers and the blade in the direction of rotation thereof, i.e. from right to left as viewed in FIG. 1. The drive shaft 23 is driven at a speed sufficient to impart an edge speed to the blade 25 which is substantially greater than the linear speed of the sheet. For example, the edge speed of the blade may be as much as three times the speed of the sheet or greater. By utilizing a very thin blade, in the range for example of 0.035 inches, and maintaining the cutting edge thereof in a sharpened condition, the sheet 13 of corrugated paperboard or the like is provided with a virtually dust-free and extremely clean cut.

The rollers 32 are preferably substantially smaller in diameter than the blade 25. The rollers may have a diameter in the range of five to seven inches, whereas the maximum diameter of the blade may be as much as approximately twelve inches. The axis of the roller shaft 33 is offset horizontally in an upstream direction from the axis of the drive shaft 23 for the blade 25. Preferably, the rollers 32 are positioned so that the line of tangent contact between the rollers and the underside of the sheet 13 coincides with a line normal to the plane of the blade 25 and tangent to the blade edge. In this manner, the rollers provide adequate support for the sheet against the downward force of the rapidly rotating blade, resulting in the characteristic clean cut.

Figure 2:
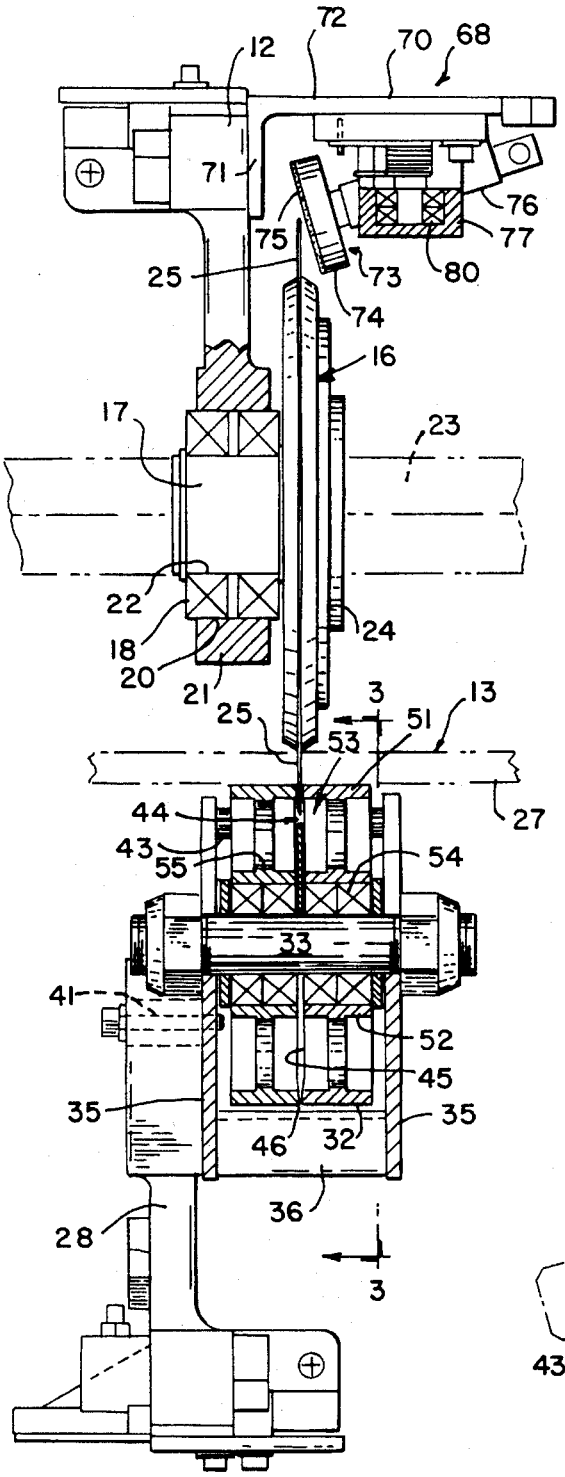
FIG. 2 is an end elevation of the rotary slitting apparatus shown in FIG. 1.

As is best shown in FIG. 2, the rollers 32 in one embodiment are machined or otherwise formed from metal with large open annular recesses 53 on either side of a central web 50. The central web 50 interconnects an outer cylindrical rim 51 and an inner hub 52, with the hub supported on bearings 54 for rotation on the roller shaft 33. The circumferential slot 44 between adjacent rollers is defined by the axially adjacent interior faces 45 thereof. In the FIG. 2 embodiment of the rollers, the width of the slot 44 is defined by adjacent outer radial edge portions 46 of the cylindrical rims 51. The slot may have a nominal width of approximately 0.0455 inch. It is important that the axially adjacent interior faces of the rollers 32 define open interior portions, such as are provided by the annular recesses 53. This allows paper scraps or accumulated dust and the like to move radially inwardly away from the slot 44 so as to prevent a build-up at the slot/blade interface and possible jamming which would adversely affect the quality of the slit. To further prevent such a build-up and jamming, the roller mounting bracket 34 also supports a stripper bar 42 within the slot 44. The stripper bar is attached at its ends beyond the outer surfaces of the rollers by a pair of mounting pins 43 extending between the side plates 35 of the mounting bracket. Thus, the stripper bar extends completely through the slot and has upper edge disposed at an acute angle with respect to the plane of the sheet and diverges therefrom in the downstream direction. The stripper bar 42 tends to prevent a build-up of accumulated debris in the slot 44 and its inclined angle tends to allow loose material to be swept out of the slot. In addition, the central webs 50 of the rollers 32 may be provided with a number of circumferentially spaced openings 55 to allow accumulated debris to be periodically removed from the annular recesses 53.

The most severe wear on the rollers 32 occurs at the axially adjacent radial edge portions 46 defining the slot 44. Abrasive wear from even small amounts of board dust and starch from the board adhesive crated dung slitting causes an eventual rounding of the edge portions 46 and eventually a widening of the slot 44. Should the slot be worn to an excessive width, shims between the bearings 54 may be moved to the axial outer faces of the rollers and the slot 44 returned to its original preferred width. It should also be noted that the construction of the roller 32 of the FIG. 2 embodiment is such that they are briefly symmetrical and may, therefore, be revered to present new radial edge portions 46.

Figure 4:
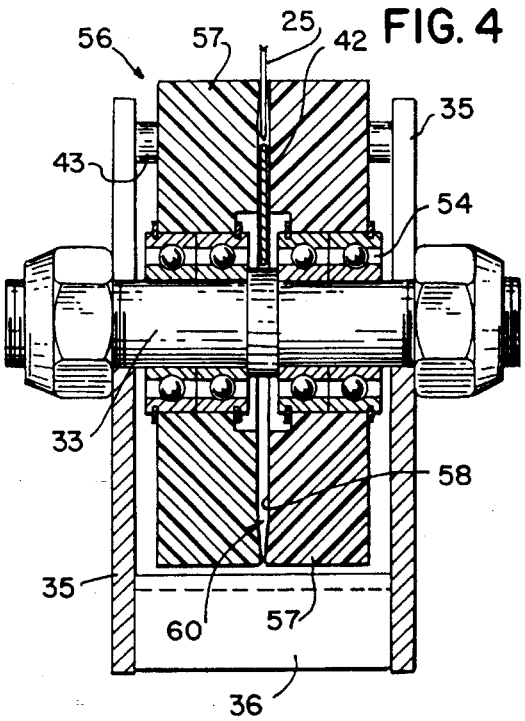
FIG. 4 is an end elevation of a roller assembly of an alternate embodiment.
Figure 5:
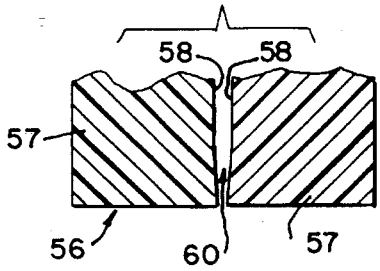
FIG. 5 is a detailed view of a portion of FIG. 4.
Figure 3:
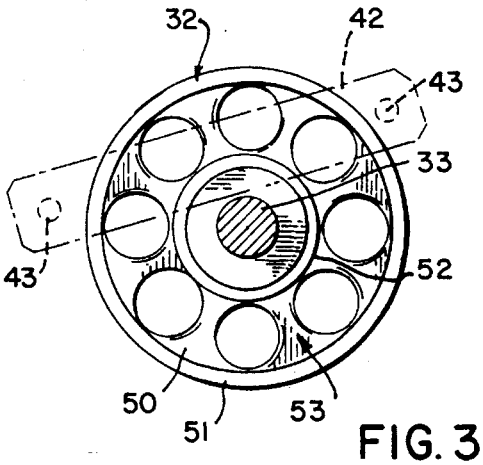
FIG. 3 is a vertical section taken on line 3—3 of FIG. 2.

In FIG. 4, there is shown an alternate embodiment of the rollers 32. In this embodiment, each roller 56 comprises a substantially solid roller body 57, preferably constructed of a tough plastic material such as Nylatron or ultrahigh molecular weight polyethylene. The axial interior faces 58 of the roller bodies 57 are constructed to diverge in a radially inward direction to define a slot 60 having its narrowest width at the outer surface of the rollers 56. This is also to allow loose paper material and the like to move away from the radial outer edge of the slot near the interface with the moving blade 25 and into the more open interior. Other, the molting assembly and stripper bar utilized with the alternate rollers 56 is identical to the preferred embodiment utilizing rollers 32.

Conventional corrugated paperboard is typically fabricated with a starch-based glue which, in prior art board slitting devices, has been found to result in a starch build-up on the cutting blades. In the apparatus of the present invention, such build-up on the blade is even more critical because of its direct adverse effect on the normally extremely high slit quality. In particular, the high speed at which the slitting blades 25 of the present invention are operated generates more heat which results in a faster build-up of starch. Eventually, the starch build-up may become great enough to result in extremely ragged cuts and tearing or crushing of the cut edges such that the clean razor slit characteristic of the present invention is completely lost. To prevent a build-up of starch on the blade surfaces adjacent the cutting edges, a blade lubricator 61 provides a continuous thin coating of a light lubricant to the blade while the blade is in slitting operation. The blade lubricator 61 includes a generally U-shaped wick holder 62 pivotally attached at its closed end to the upper tool head 12 by a mounting bolt 63. The wick holder has a pair of spaced, generally parallel legs 64 operatively positioned to straddle the cutting edge of the blade 25. A piece of wick material is inserted in the wick holder and secured to the inside faces of the legs 64. With the wick holder disposed in its operative full line position shown in FIG. 1, the wick 65 is in continuous contact with the blade surfaces adjacent the cutting edge. Small metered amounts of a light liquid lubricant, such as a thin penetrating oil, are supplied to the wick holder and onto the wick 65 by a positive displacement injector 66 attached to the tool head 12 and receiving lubricant from a common source (not shown). Only very small amounts of lubricant are necessary to coat the blade edge with a thin layer that prevents starch from sticking to the blade, thereby precluding any starch build-up. For example, the positive displacement injector 66 may provide about 0.2 cc of lubricant to the wick on timed pulses every eight seconds. Obviously, the amount of starch available to build-up on a blade is greatly dependent on the upstream gluing process and variations in the volume of lubricant supplied and the timing of the injection pulses may be suitably provided. To facilitate changing or repositioning of the blade 25, the lubricator 61 is pivotable about the mounting bolt 63 to an inoperative dashed line position shown in FIG. 1 in which the wick holder 62 and attached wick 65 are spaced radially beyond the blade edge.

Figure 7:
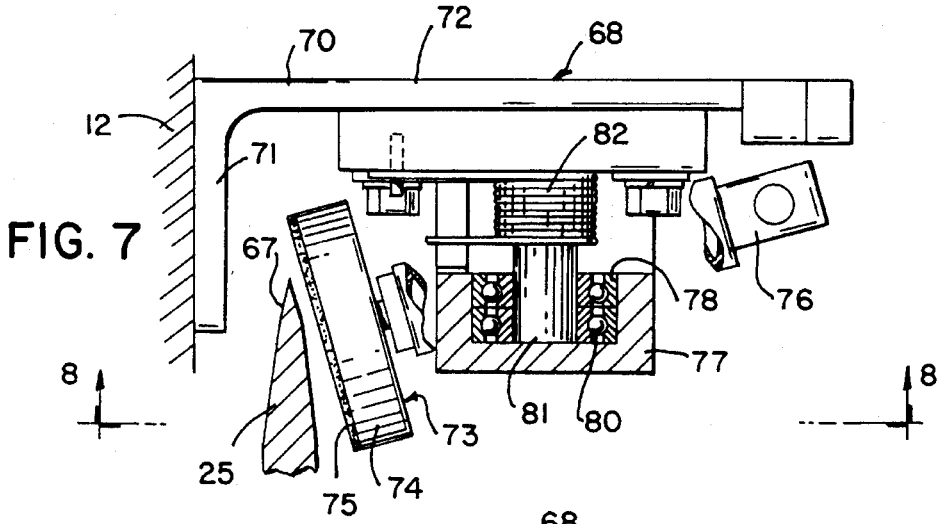
FIGS. 7 and 8 are detail views of the rotary blade sharpening apparatus.
Figure 8:
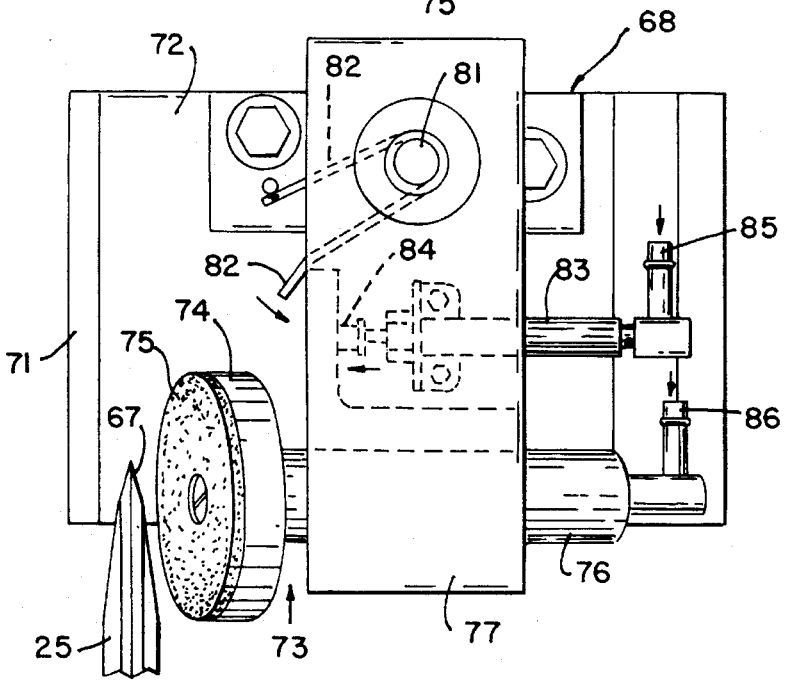

Each of the slitting blades 25, as previously indicated, may have a thickness of approximately 0.035 inch and is preferably made of a high quality steel. The cutting edge 67 of the blade as shown in the sectional view of the blade in FIG. 7 is provided with a double bevel. The outer bevel at the cutting edge may have, for example, an included angle of 37°. In order to maintain the high quality slit, the blade must not only be kept free from the build-up of starch, but the cutting edge must be maintained in a razor sharp condition.

To maintain the necessary sharp cutting edge, the slitting apparatus includes a blade sharpener 68 adapted to sharpen one face of the outer blade edge bevel while the blade is rotating. The blade sharpener 68 is attached to an angled mounting bracket 70 mounted by its vertical leg 71 to the face of the upper tool head 12 such that the horizontal leg 72 extends over the upper edge of the blade 25. A rotary sharpening tool 73 is attached to the horizontal leg 72 of the mounting bracket and depends downwardly therefrom. The sharpening tool includes a circular sharpening head 74 having a flat outer abrasive face 75. The head is rotatably attached to a small air motor 76 attached to one end of a tool body 77 such that the abrasive face 75 is disposed at the same angle as the adjacent face of the blade edge bevel. The tool body is pivotally attached at its end opposite the air motor to the underside of the horizontal leg 72 of the mounting bracket 70. Specifically, the end of the tool body 77 is provided with a cylindrical recess 78 providing the outer race for a ball bearing assembly 80, the inner race of which is attached to the end of a stub shaft 80 attached to and extending down from the mounting bracket 70. A torsion spring 82 surrounds the stub shaft 81 with its ends in engagement with the mounting bracket and the tool body 77 to bias the latter to an inoperative position in which the abrasive face 75 is out of engagement with the blade edge. A small single acting air cylinder 83 is attached to the mounting bracket 70 with the rod end 84 of the cylinder in contact with the surface of the tool body 77. When compressed air is supplied to the air cylinder inlet fitting 85 from an external source (not shown), the rod end 84 will be extended and the tool body and attached sharpening head 74 will be rotated about the stub shaft 81, against the bias of the torsion spring 82, until the abrasive face 75 makes light contact with the beveled edge of the blade 25. Air cylinder 83 operates at very low pressure such that the abrasive face 75 makes light surface contact with the blade edge. The air motor 76 which drives the rotary sharpening head 74 is also supplied with compressed air via a fitting 86 to drive the air motor whenever the tool body is rotated into operative sharpening position by activation of the air cylinder 83. The air motor 76 preferably operates at relatively high speed, for example, about 5,000 rpm.

Under substantially continuous operating conditions, if the blades 25 are made of a high quality tool steel, it has been found that the blades need only be sharpened a few times per week. The sharpening tool 73 is operated so that the sharpening head 74 applies only a very light force of not more than about three pounds to the face of the bevel. Sharpening contact need be maintained for only a short period of time to remove approximately 0.001–0.002 inch of material from the blade edge. Periodically, the blade may be removed from the tool holder 16 and reversed so that the opposite face of the edge bevel may be sharpened to maintain an overall balance in the cutting edge of the blade. The slitting blades of the present invention are tolerant to a substantial reduction in overall blade diameter as a result of sharpening without adversely affecting the quality of the slit. Also, little adjustment, if any, of the blade position is necessary over its useful life.

Figure 6:
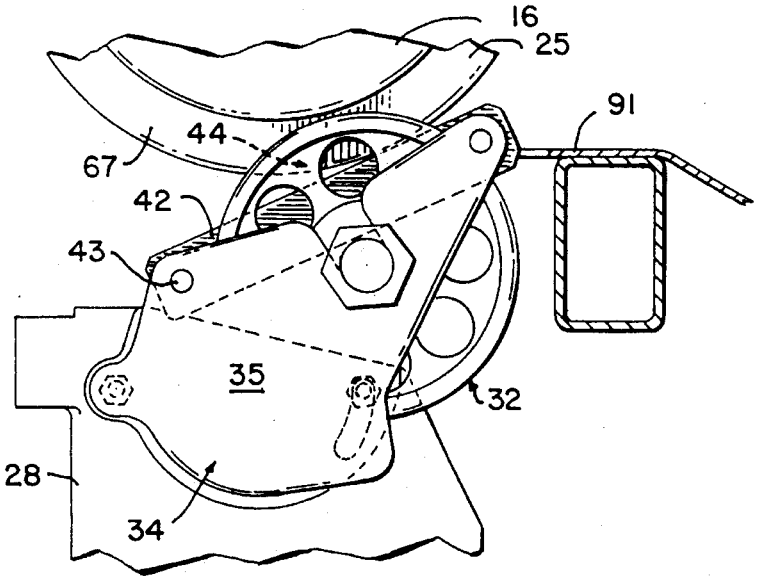
FIG. 6 is a side elevation of an alternate embodiment of the roller bracket assembly.

As indicated previously, in a typical slitter apparatus, a plurality of upper tool heads 12 and slitting blades 25 are mounted on a common drive shaft 23 for individual movement and selective positioning along the linear ways 14 to provide a plurality of longitudinal slits in the advancing sheet 13 at any selected positions across the width of the sheet. To individually position each upper tool head 12, an electric servomotor 87 is mounted on each tool head and drives a pinion gear 88 positioned to engage a linear toothed rack 90 attached to the underside of the upper beam 10, in a manner well known in the art. It is also known to utilize a similar motor-driven rack and pinion assembly to position the lower tool heads 28. In accordance with the present invention, however, it has been found that both the upper and lower tool heads may be simultaneously moved and repositioned with a single upper servomotor 87 and its related gear 88 and rack 90 in a manner in which the overlapping portion of the cutting blade 25 within the slot 44 between the rollers 32 (or 56) bears on the axial inner face of the roller and carries the roller assembly and lower tool head 28 along with the moving upper head assembly. In some instances, however, it is recognized that the blade/roller overlap, the strength of the blade material, or the speed or thrust of the servomotor assembly may be such that the bearing force between the blade edge and the rollers may break or otherwise damage the blade. Thus, in FIG. 6, there is shown a modified assembly in which the entire roller mounting bracket 34 and attached rollers 32 may be pivoted upwardly so that a much larger portion of the blade edge is received within the slot 44 to enhance the bearing contact surface therebetween and distribute the load imposed by repositioning over a greater portion of the blade edge. Repositioning of the upper and lower tool heads is, of course, undertaken between board runs and, therefore, at a time when there is no sheet present to interfere with the substantial upward movement of the rollers and roller mounting bracket assembly.

As previously indicated, the rollers 32 (or 56) support the advancing sheet at the point where the slitting blade passes through the sheet. Supplemental support of the sheet 13 is also preferably provided just upstream of the rollers and slitting knife by an appropriate sheet supporting surface 91, as shown in FIG. 1. The continuous sheet 13 or web is otherwise driven by appropriate means external of the slitting apparatus, as is also well known in the art. As is also known in the prior art, each of the plurality of upper tool heads 12 mounted on the common drive shaft 23 and linear ways 14 are simultaneously locked in their selected slitting positions with a common lockdown apparatus 92. In the embodiment shown, the lockdown apparatus comprises a long cylindrical cam extending across the full width of the apparatus and supported for rotation on its axis between a locking position with its cylindrical outer surface in locking engagement with a locking pad 94 on each tool head and an unlocked position in which an axial flat surface 95 on the cam 93 is positioned directly adjacent and spaced from the locking pad 94. In the latter position, the tool heads are unlocked for repositioning. Similarly, the plurality of lower tool heads 28 are also locked in operating position with an identical lockdown apparatus 92 including all components identical to those used for the upper locking mechanism.

Various modes of carrying out the invention are contemplated as being within the scope of the following claims particularly pointing out and distinctly claiming the subject matter which is regarded as the invention.

We claim:

1. An apparatus for longitudinally slitting a moving sheet of corrugated paperboard of the type having multiple paper layers secured together with a starch-based adhesive, said apparatus comprising:

a tool head mounted on one side of the sheet and translatable laterally across the width of the sheet on a line parallel thereto;

an annular blade rotatably attached to said tool head said blade having a smooth continuous peripheral cutting edge defined by similar beveled edge faces on opposite sides of the cutting edge, and said cutting edge extending beyond the opposite side of the sheet;

a counterhead mounted on the opposite side of the sheet and translatable laterally across the width of the sheet on a line parallel to the line of translation of said tool head;

idler roller means rotatably attached to said counter-head and having a cylindrical outer surface positioned to make tangent contact with said opposite side of the sheet;

an annular circumferential slot in the outer surface of said roller means, said slot having a width greater than the maximum width of the peripheral edge of said blade defined by said edge faces and positioned to receive without contact said blade edge and edge faces therein to form a nip;

means for rotating said blade to move the peripheral edge thereof in the direction of movement of the sheet and at a speed at least about two times greater than the speed of the sheet;

direct contact means for applying a lubricant to the peripheral edge of said blade for preventing the adherence and build-up of starch thereon; and, means for sharpening the cutting edge of the blade while said blade is rotating.

2. The apparatus as set forth in claim 1 wherein said lubricant applying means comprises:

a wick holder attached to said tool heads;

a wick mounted on said holder and operatively positioned to straddle the cutting edge of the blade and to contact the blade edge and edge faces; and, means for supplying metered amounts of a lubricant to said wick.

3. The apparatus as set forth in claim 2 wherein said lubricant supplying means comprises:

means for intermittently supplying a selected volume of lubricant to said wick in a timed sequence; and, means for varying one of said selected volume and timed sequence.

4. The apparatus as set forth in claim 1 wherein said sharpening means comprises:

a sharpening tool mounting bracket attached to said tool head;

a rotary sharpening tool pivotally attached to said bracket for movement between an operative position in contact with one of the edge faces of the cutting edge of said blade and an inoperative position out of contact therewith;

means for moving said tool between its operative and inoperative positions; and, means for rotating said tool when in its operative position.

5. The apparatus as set forth in claim 4 wherein said sharpening means comprises:

means for biasing said sharpening tool to and holding the same in the inoperative position; and, means for moving said tool against said biasing means to the operative position.

6. The apparatus as set forth in claim 1 wherein the rotational axis of said roller means is offset in the upstream direction from the rotational axis of said blade by a distance sufficient to place the line of tangent contact of said roller means with the sheet coincident with a line normal and tangent to the blade edge.

7. The apparatus as set forth in claim 6 wherein said roller means comprises a pair of coaxially mounted rollers having axially adjacent interior faces with outer radial edge portions spaced to define said annular circumferential slot.

8. The apparatus as set forth in claim 7 wherein the adjacent interior faces of said rollers are divergent in a radially inward direction.

9. The apparatus as set forth in claim 7 wherein the adjacent interior faces of said rollers are recessed to define open interior portions.

10. An apparatus for longitudinally slitting a continuous, traveling sheet of corrugated paperboard made of multiple layers of paper glued together with a starch-based adhesive to provide a plurality of parallel spaced slits, said apparatus comprising:

an upper support structure overlying the sheet and having upper guide means defining an upper linear path across the width of the sheet;

a plurality of upper tool heads mounted on said upper guide means, each of said upper tool heads movable individually thereon along said upper linear path;

a tool holder rotatably attached to each upper tool head for rotation on a common axis parallel to said guide means;

a drive shaft positioned on said common axis to simultaneously drive said tool holders and to support said tool holders and upper tool heads for movement along said upper guide means;

a thin annular blade carried on each tool holder, each of said blades presenting a downwardly depending continuous circular cutting edge defined by smooth beveled edge faces on opposite sides of said edge, which edge and side faces extend below the bottom side of the sheet;

a lower support structure under the sheet and having lower guide-means defining a lower linear path parallel to the upper linear path;

a plurality of lower tool heads mounted on said lower guide means, each of said lower tool heads movable individually thereon along said lower linear path;

idler roller means rotatably attached to each of said lower tool heads, each roller means having a cylindrical outer surface positioned to make tangent contact with the bottom side of the sheet;

an annular circumferential slot in the outer surface of said roller means, said slot having a width greater than the maximum width of the edge faces defining said blade edge and positioned to receive therein without contact the blade cutting edge and edge faces extending below the sheet;

means for rotating said drive shaft to move said blade cutting edges at a speed at least about two times greater than the speed of the moving sheet;

direct contact means for applying a lubricant to said blade cutting edges to prevent the adherence and build-up of starch thereon; and, means for sharpening the blade cutting edges while said blades are operating.

11. The apparatus as set forth in claim 10 including positioning means operatively interconnecting each upper tool head and said upper support structure for moving said tool head along said upper guide means and for carrying therewith its corresponding lower tool head along said lower guide means.

12. The apparatus as set forth in claim 11 including means for pivotally attaching each of said roller means to its lower tool head on a pivot axis parallel to the axis of rotation of said roller means for varying the mount of blade edge received in said slot.

13. A method for longitudinally slitting a moving sheet of corrugated paperboard manufactured from multiple paper layers glued together with a starch-based adhesive, said method comprising the steps of (1) mounting an annular blade above the sheet for rotation on an axis parallel to the sheet and transverse to the direction of movement thereof;

(2) providing said blade with a smooth continuous peripheral cutting edge defined by similar beveled edge faces on opposite sides of said edge;

(3) positioning said blade to extend each blade edge and edge faces beyond the bottom side of the sheet;

(4) mounting an idler roller having a cylindrical outer surface below the sheet for rotation on an axis parallel to the axis of rotation of said blade;

(5) positioning the cylindrical outer surface of said roller to make tangent contact with the underside of the sheet;

(6) providing the cylindrical outer surface of said roller with an annular circumferential slot having a width greater than the maximum width of said edge faces;

(7) forming a nip by positioning said roller and slot to receive therein without contact said blade edge and edge faces;

(8) rotating said blade to move the blade edge in the direction of movement of said sheet and at a speed at least about two times greater than the speed of the sheet;

(9) placing a lubricator in direct contact with the peripheral edge and edge faces of said blade;

(10) supplying metered amounts of a lubricant to said lubricator sufficient to prevent the adherence and build-up of adhesive on said blade; and,

(11) sharpening the cutting edge of the blade while said blade is rotating.

14. A method for longitudinally slitting a moving sheet of corrugated paperboard of the type having multiple paper layers secured together with a starch-based adhesive, said method comprising the steps of:

(1) mounting a toll head above the sheet for laterally translatable movement across the width of the sheet on a line parallel thereto;

(2) mounting an annular blade for rotation on said tool head;

(3) providing said blade with a smooth continuous peripheral cutting edge defined by similar beveled edge faces on opposite sides of said edge;

(4) positioning said tool head to extend said blade beyond the lower side of the sheet;

(5) positioning a counterhead below the sheet for laterally translatable movement across the width of the sheet on a line parallel to the line of translation of said tool head;

(6) mounting an idler roller having a cylindrical outer surface for rotation on said counterhead;

(7) positioning said counterhead such that the cylindrical outer surface of said roller makes tangent contact with the underside of the sheet;

(8) providing the cylindrical outer surface of said roller with an annular circumferential slot having a width greater than the maximum width of said blade edge defined by said edge faces;

(9) forming a nip by positioning said roller and slot to receive without contact said blade edge and edge faces therein;

(10) rotating said blade to move the blade edge in the direction of movement of said sheet and at a speed at least about two times greater than the speed of the sheet;

(11) placing a lubricator in direct contact with the peripheral edge and edge faces of said blade;

(12) supplying metered mounts of a lubricant to Said lubricator sufficient to prevent the adherence and build-up of starch on said blade; and,

(13) sharpening the cutting edge of the blade while said blade is rotating.

*15. An apparatus for longitudinally slitting a moving web of corrugated paperboard of the type having multiple paper layers secured together with a starch-based adhesive, said apparatus comprising:*

*a tool head mounted on one side of the web and translatable laterally across the width of the web on a line parallel thereto;*

*an annular blade rotatably attached to said tool head, said blade having a smooth continuous peripheral cutting edge defined by similar beveled edge faces on opposite sides of the cutting edge, and said cutting edge extending beyond the opposite side of the web;*

*a counterhead mounted on the opposite side of the web and translatable laterally across the width of the web on a line parallel to the line of translation of said tool head;*

*idler roller means rotatably attached to said counterhead and having a cylindrical outer surface positioned to make tangent contact with said opposite side of the web;*

*an annular circumferential slot in the outer surface of said roller means, said slot having a width greater than the maximum width of the peripheral edge of said blade defined by said edge faces and positioned to receive without contact said blade edge and edge faces therein to form a nip;*

*means for rotating said blade to move the peripheral edge thereof in the direction of movement of the web and at a speed substantially greater than the speed of the web;*

*direct contact means for applying a lubricant to the peripheral edge of said blade for preventing the adherence and build-up of starch thereon; and,*

*means for mounting said counterhead to position the rotational axis of said rotational axis of said blade by a distance sufficient to place the line of tangent contact of said roller means with the web coincident with a line normal and tangent to the blade edge.*

*16. The apparatus as set forth in claim 15 including means for sharpening the cutting edge of the blade while said blade is rotating.*

*17. An apparatus for longitudinally slitting a moving web of corrugated paperboard of the type having multiple paper layers secured together with a starch-based adhesive, said apparatus comprising;*

*an annular blade rotatably attached to said tool head, said blade having a smooth continuous peripheral cutting edge defined by similar beveled edge faces on opposite sides of the cutting edge, and said cutting edge extending beyond the opposite side of the web;*

*a counterhead mounted on the opposite side of the web and translatable laterally across the width of the web on a line parallel to the line of translation of said tool head;*

*idler roller means rotatably attached to said counterhead and having a cylindrical outer surface positioned to make tangent contact with said opposite side of the web;*

*an annular circumferential slot in the outer surface of said roller means defined by axial interior side faces, said slot having a width greater than the maximum width of the peripheral edge of said blade defined by said edge faces and positioned to receive without contact said blade edge and edge faces therein to form a nip;*

*means for rotating said blade to move the peripheral edge thereof in the direction of movement of the web and at a speed substantially greater than the speed of the web; and,*

*means for translating said tool head in a lateral direction to reposition said blade and to simultaneously carry and reposition therewith said roller means by direct contact between said interior roller side faces and the portion of the blade received in said slot.*

*18. The apparatus as set forth in claim 17 including means for pivotally attaching said roller means to the counterhead on a pivot axis parallel to the axis of rotation of said roller means for varying the amount of blade edge received in said slot.*

*19. An apparatus for longitudinally slitting a moving web of corrugated paperboard of the type having multiple paper layers secured together with a starch-based adhesive, said apparatus comprising:*

*a tool head mounted on one side of the web and translatable laterally across the width of the web on a line parallel thereto;*

*an annular blade rotatably attached to said tool head, said blade having a smooth continuous peripheral cutting edge defined by similar beveled edge faces on opposite sides of the cutting edge, and said cutting edge extending beyond the opposite side of the web;*

*a counterhead mounted on the opposite side of the web and translatable laterally across the width of the web on a line parallel to the line of translation of said tool head;*

*means attached to said counterhead for supporting the moving web and having a surface portion positioned to make supporting contact with said opposite side of the web;*

*a slot in the surface portion of said web supporting means defined by opposed interior side faces, said slot having a width greater than the maximum width of the peripheral edge of said blade defined by said edge faces and positioned to receive without contact said blade edge and edge faces therein to form a nip;*

*means for rotating said blade to move the peripheral edge thereof in the direction of movement of the web and at a speed substantially greater than the speed of the web;*

*means for sharpening the cutting edge of the blade while said blade is rotating;*

*direct contact means for applying a lubricant to the peripheral edge of said blade for preventing the adherence and build-up of starch thereon; and,*

*means for translating said tool head in a lateral direction to reposition said blade and to simultaneously carry and reposition therewith said web supporting means by direct contact between said interior slot side faces and the portion of the blade received in said slot.*

*20. A method for longitudinally slitting a moving web of corrugated paperboard manufactured from multiple paper layers glued together with a starch-based adhesive, said method comprising the steps of:*

*(1) mounting an annular blade above the web for rotation on an axis parallel to the web and transverse to the direction of movement thereof;*

*(2) providing said blade with a smooth continuous peripheral cutting edge defined by similar beveled edge faces on opposite sides of said edge;*

*(3) positioning said blade to extend said blade edge and edge faces beyond the bottom side of the web;*

*(4) mounting an idler roller having a cylindrical outer surface below the web for rotation on an axis parallel to the axis of rotation of said blade;*

*(5) positioning the cylindrical outer surface of said roller to make tangent contact with the underside of the web;*

*(6) providing the cylindrical outer surface of said roller with an annular circumferential slot having a width greater than the maximum width of said edge faces;*

*(7) forming a nip by positioning said roller and slot to receive therein said blade edge and edge faces;*

*(8) mounting said roller to position the axis of rotation thereof in the upstream direction from the rotational axis of the blade by a distance sufficient to place the line of tangent contact of said roller with the web coincident with a line normal and tangent to the blade edge;*

*(9) rotating said blade to move the blade edge in the*

*direction of movement of said web and at a speed substantially greater than the speed of the web; and,*

*(10) lubricating the peripheral edge and edge faces of said blade with a direct contact lubricant applicator to prevent the adherence and build-up of adhesive on said blade.*

*21. The method as set forth in claim 20 including the step of sharpening the cutting edge of the blade while said blade is rotating.*

*22. A method for longitudinally slitting a continuous moving web of corrugated paperboard of the type having multiple paper layers secured together with a starch-based adhesive, said method comprising the steps of:*

*(1) mounting a tool head above the web for laterally translatable movement across he width of the web on a line parallel thereto;*

*(2) mounting an annular blade for rotation on said tool head;*

*(3) providing said blade with a smooth continuous peripheral cutting edge defined by similar beveled edge faces on opposite sides of said edge;*

*(4) positioning said tool head to extend said blade beyond the lower side of the web;*

*(5) positioning a counterhead below the sheet for laterally translatable movement across the width of the sheet on a line parallel to the line of translation of said tool head;*

*(6) mounting an idler roller having a cylindrical outer surface for rotation on said counterhead;*

*(7) positioning said counterhead such that the cylindrical outer surface of said roller makes tangent contact with the underside of the web;*

*(8) providing the cylindrical outer surface of said roller with an annular circumferential slot defined by interior roller side faces, aid slot having a width greater than the maximum width of said blade edge defined by said edge faces;*

*(9) forming a slitting nip by positioning said roller and slot to receive said blade edge and edge faces therein;*

*(10) forming a longitudinal gap in the web at the slitting nip;*

*(11) translating said tool head in a lateral direction to position said blade and to simultaneously carry and position therewith said counterhead and said roller by direct contact between said interior roller side faces and the portion of the blade received in said slot; and,*

*(12) rotating said blade to move the blade edge in the direction of movement of said sheet and at a speed substantially greater than the speed of the sheet.*

*23. The method as set forth in claim 22 including the steps of:*

*(1) lubricating the blade by placing a lubricator in direct contact with the peripheral edge and edge faces of said blade; and,*

*(2) sharpening the cutting edge of the blade while said blade is rotating.*

* * * * *

UNITED STATES PATENT AND TRADEMARK OFFICE

CERTIFICATE OF CORRECTION

PATENT NO. Re. 35,086

DATED November 14, 1995

INVENTOR(S) Richard F. Paulson et al

It is certified that error appears in the above-indentified patent and that said Letters Patent is hereby corrected as shown below:

Claim 15, column 13, line 18, after "said" (first occurrence) insert --roller means offset in the upstream direction from the--.

Claim 17, column 13, line 29, after "comprising:" add the following paragraph --a tool head mounted on one side of the web and translatable laterally across the width of the web on a line parallel thereto;--.

Claim 22, column 15, line 15, change "he" to --the--; and, column 16, line 6, change "aid" to ---said--.

Signed and Sealed this

Twenty-sixth Day of March, 1996

Bruce Lehman

*Attest:*

BRUCE LEHMAN

*Attesting Officer*

*Commissioner of Patents and Trademarks*